No. 660,486. Patented Oct. 23, 1900.
J. W. BROWN, Jr.
WORK HOLDER AND CENTERING DEVICE THEREFOR.
(Application filed Nov. 16, 1899.)

(No Model.) 2 Sheets—Sheet 1.

Witnesses:
Frank L. A. Graham.
Louis M. F. Whitehead.

Inventor:—
John Wilson Brown Jr.
by his Attorneys:—
Howson & Howson

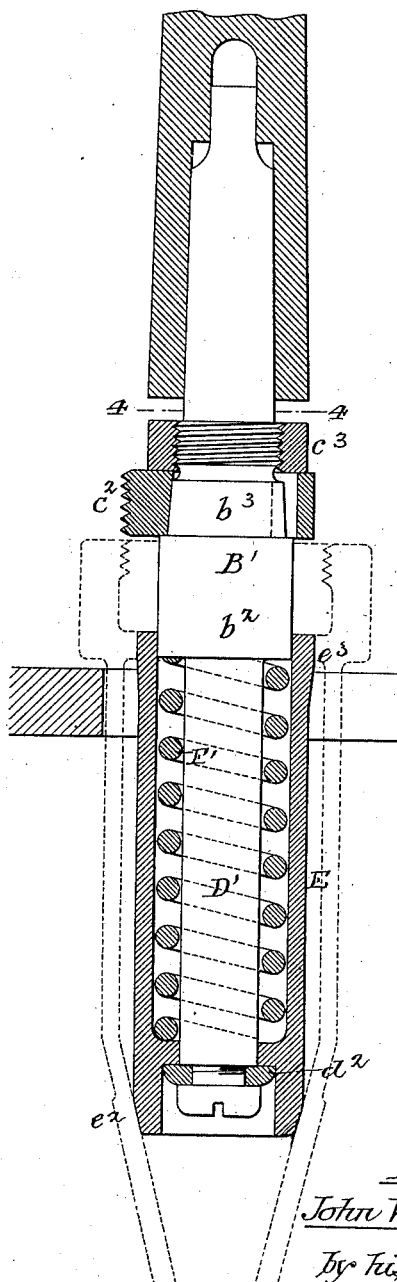

UNITED STATES PATENT OFFICE.

JOHN WILSON BROWN, JR., OF PHILADELPHIA, PENNSYLVANIA.

WORK-HOLDER AND CENTERING DEVICE THEREFOR.

SPECIFICATION forming part of Letters Patent No. 660,486, dated October 23, 1900.

Application filed November 16, 1899. Serial No. 737,197. (No model.)

*To all whom it may concern:*

Be it known that I, JOHN WILSON BROWN, Jr., a citizen of the United States, residing in Philadelphia, Pennsylvania, have invented certain Improvements in Work-Holders and Centering Devices Therefor, of which the following is a specification.

The object of my invention is to construct a device which will automatically center work and hold it in a central position while a cutting-tool is operating and which will free the work immediately after the tool has finished cutting. This object I attain in the following manner, reference being had to the accompanying drawings, in which—

Figure 1:
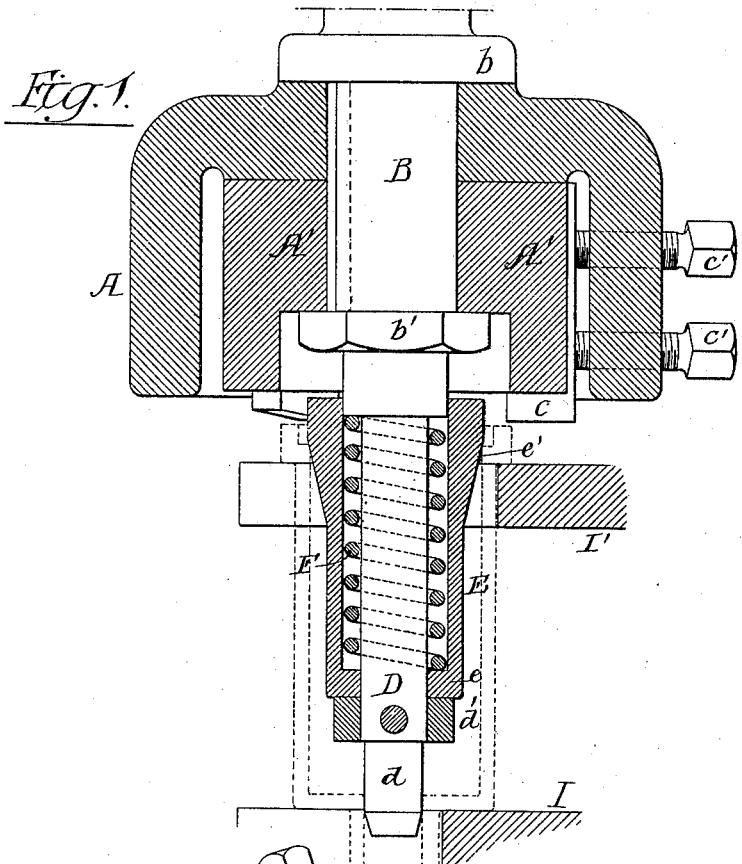
Figure 2:
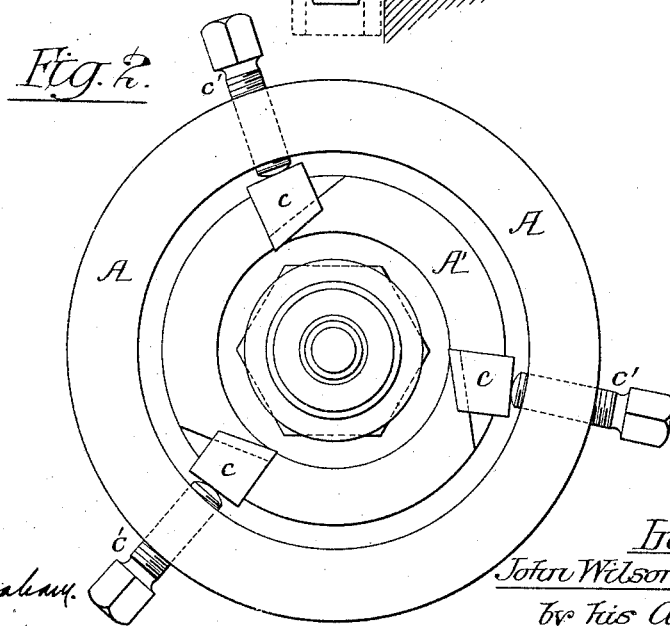

Figure 1 is a sectional view of a cutting-tool, showing my improved work-centering device. Fig. 2 is an inverted plan view. Fig. 3 is a sectional view illustrating my invention slightly modified and applied to a screw-thread cutter; and Fig. 4 is a section on the line 4 4, Fig. 3.

My invention is especially adapted for use in connection with automatic machines—that is, machines in which the work to be cut is mounted in position and after the work is in position the mechanism is started, the cutters making the desired cut and returning, and at the end of the return stroke the mechanism will stop to allow the attendant to remove the finished work and insert another blank.

Referring to Fig. 1, A is the cutter-head, and A′ a block resting within the cutter-head. B is a spindle having a shoulder $b$, and on the spindle is a nut $b'$. The cutter-head and block are confined between the shoulder and the nut, as clearly shown in Fig. 1.

Carried by the block A′ are cutters $c\ c$. These cutters are held in position by screws $c'$, adapted to a flange of the head A. D is an extension of the spindle B. This extension has a portion $d$, which in the present instance enters the work as shown in Fig. 1.

Mounted on the extension D is a sleeve E, provided with a flange $e$ at its lower end and has a tapered upper end $e'$, which fits the work at a point not to interfere with the cutting-tools. The sleeve rests upon a collar or nut $d'$, secured to the extension D, and the upper end of the sleeve is guided by the enlargement of the spindle. Mounted within the sleeve, between its flange $e$ and the end of the spindle B, is a spring F, which tends to force the sleeve away from the cutters. I I′ are the supports for the work to be cut. The work is shown in Fig. 1 by dotted lines. If, for instance, a large number of pieces of the form shown by dotted lines, Fig. 1, are to be finished by cutting either the end or the inner or outer surface of a portion of the piece or if the piece is to be threaded, the sleeve is made to fit the piece at top and bottom, as shown, and the supports are formed to engage the piece and prevent it from turning, yet will allow the piece to center itself on the sleeve.

When the spindle B is raised, the entire mechanism is above the support I′, so that a piece can be placed in position on the support I. As the spindle is lowered the sleeve E will enter the piece until it seats itself, as shown, centering the piece in reference to the cutter, and as the spindle B continues to descend the spring will be compressed, thus keeping the piece in position while the cutters $c\ c$ cut the outer face of the projecting rim of the piece. When the cut has been made and the spindle, with its cutters, raised, the spring will be relieved, and, finally, the sleeve E will be withdrawn from the piece and another piece can be inserted.

In Figs. 3 and 4 I have shown a modification of the device. A washer $d^2$ holds the sleeve in place against the pressure of the spring F′. The upper end of the sleeve is adapted to the enlarged portion $b^2$ of the spindle. Carried by the spindle is a screw-thread cutter $c^2$ of the form as shown in Fig. 4. This cutter is adapted to a tapered portion $b^3$ of the spindle and is held in place by a nut $c^3$, adapted to the threaded portion of the spindle. In this figure I have shown a sleeve having a tapered portion $e^2$ at the lower end as well as at the upper end. Thus after the piece is placed in position on the support and is prevented from turning by a lug or projection the spindle is driven down into the piece, the sleeve E′ will seat itself at two points, and thus center the piece in respect to the cutter, and as the spindle continues its downward movement the cutters will cut an internal thread on the piece, as shown by the dotted lines, and after the spindle has traveled a certain distance the driving mechanism is reversed and the spindle is withdrawn, freeing the piece, so that it can be removed and another piece placed in position.

It will be seen that the centering device can be adapted to a spindle or head having a cutter of any form, and it can be so arranged that it will center the piece to be cut immediately before the cutter acts and relieve the piece immediately after the cutter acts, thus saving considerable time in placing, centering, and clamping the piece.

I claim as my invention—

1. A cutter-head having a yielding extension or mandrel arranged to enter the work before the cutter engages the same, said mandrel bearing against the work at two or more points both before and during the time that the cutter is in operation and thereby holding the work in alinement, substantially as described.

2. The combination of a cutter-head, a spindle, an extension on the spindle centrally set in respect to the cutter, a sleeve mounted on the extension and adapted to engage the work, and a spring between the sleeve and the spindle, substantially as described.

3. The combination of a spindle, a cutter mounted thereon, a stem projecting beyond the cutters, a sleeve adapted to the stem and to the lower portion of the spindle, a spring between the spindle and an internal flange on the sleeve, and a stop to limit the outward movement of the sleeve, substantially as described.

4. The combination of a cutter-head, a spindle, an extension on the spindle, a sleeve mounted on the extension, a portion of the sleeve being tapered to fit the piece to be alined, substantially as described.

5. The combination of a cutter-head, a spindle, an extension on the spindle, a sleeve mounted on the extension, a collar or shoulder on the spindle, and an internal flange on the sleeve, a spring mounted between the collar and internal flange, and a guide for the upper end of the sleeve, substantially as described.

6. The combination of a spindle, a cutter-head mounted thereon, the spindle extending beyond the cutter-head, a collar or flange on the spindle, a sleeve adapted to slide upon the rod the collar limiting the outward movement of the sleeve, a spring between the internal flange of the sleeve and the spindle, the upper portion of the sleeve being tapered to fit the piece to be cut, and an extension adapted to center the lower portion of the piece, substantially as described.

In testimony whereof I have signed my name to this specification in the presence of two subscribing witnesses.

JOHN WILSON BROWN, Jr.

Witnesses:
 WILL. A. BARR,
 JOS. H. KLEIN.